3,173,932
15-SUBSTITUTED ESTRA-1,3,5(10)-TRIENES
Ruddy Littell, Rivervale, N.J., and Edward W. Cantrall, Pearl River, Seymour Bernstein, New City, and Samuel Gordon, Pearl River, N.Y., assignors to American Cyanamid Company, Stamford, Conn., a corporation of Maine
No Drawing. Filed Nov. 2, 1962, Ser. No. 235,124
7 Claims. (Cl. 260—397.4)

This invention relates to new steroid compounds. More particularly, it relates to 15-substituted estra-1,3,5(10)-trienes and methods of preparing the same.

The novel steroids of the present invention can be illustrated by the following structural formula:

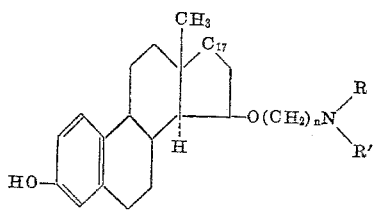

in which R and R' are lower alkyl radicals, $C_{17}$ is selected from the group consisting of $>C=O$, $>C=NOH$ and $>C=N-O$-lower alkyl, $n$ is an integer from 2 to 4, and mineral acid salts thereof.

The above free steroidal compounds are, in general, crystalline solids relatively insoluble in water but soluble in alkali and organic solvents such as lower alkyl alcohols, acetone, ethyl acetate, benzene, toluene, chloroform, ether, petroleum ether and the like. The mineral acid salts are soluble in water.

The compounds of this invention form acid addition salts with acids such as hydrochloric acid, sulfuric acid, acetic acid, phosphoric acid, tartaric acid, citric acid, maleic acid and the like. They also form quaternary ammonium compounds such as trialkyl ammonium when reacted with lower alkyl halides, for example, methyl iodide, ethyl iodide, etc.

The compounds of the present invention may be prepared from starting materials such as 3-hydroxy-estra-1,3,5(10),15-tetraen-17-one which is reacted with an alcohol of the formula:

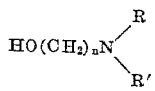

in which R and R' are lower alkyl radicals and $n$ is an integer from 2 to 4. The reaction is carried out at a temperature of from 10° to 60° C. for a period of 15 minutes to several hours. The resulting products have a keto group in the 17-position.

The present compounds having an oximino or lower alkoxyimino group in the 17-position are prepared by reacting the corresponding 17-keto steroid with hydroxylamine or a lower alkyl hydroxylamine. The reactants are heated in a substantially aqueous solvent to a temperature of from about 60° C. to 120° C. for from one to twenty-four hours. While the desired product can be recovered by several methods it is usually desirable to recover the product in the form of a mineral acid salt.

The compounds of the present invention have been found to have anti-cholesteremic activity when tested in rats. Compounds possessing this property in the past have been found useful in lowering blood cholesterol.

The following examples describe in detail the preparation of representative 15-substituted estra-1,3,5(10)-trienes of the present invention.

EXAMPLE 1

Preparation of 3-hydroxy-15β-(β-dimethylaminoethoxy)-estra-1,3,5(10)-trien-17-one A solution containing 300 mg. of 3-hydroxy-estra-1,3,5(10),15 - tetraen - 17 - one (United States Patent 3,031,470) and 1.0 ml. of 5% aqueous sodium hydroxide in 20 ml. of 2-dimethylaminoethanol is stirred for two hours at room temperature under nitrogen. Water is added followed by several drops of acetic acid to give 220 mg. of yellow powder, melting point 180–184° C. Two crystallizations from acetone-petroleum ether gives an analytical sample, melting point 185–187° C.

When in the above example 2-dimethylaminoethanol is replaced by the following, 2-diethylaminoethanol, 3-diethylaminopropanol and 4-diethylaminobutanol the products resulting are respectively, 3-hydroxy-15β-(β-diethylaminoethoxy) - estra - 1,3,5(10)-trien-17-one, 3-hydroxy-15β - (γ-diethylaminoethoxy) - estra - 1,3,5(10)-trien-17-one and 3-hydroxy-15β-(δ-diethylaminoethoxy)-estra-1,3,5(10)-trien-17-one.

EXAMPLE 2

Preparation of 3-hydroxy-15β-(β-diethylaminoethoxy)-estra-1,3,5(10)-trien-17-one A solution containing 600 mg. of 3-hydroxy-estra-1,3,5(10),15-tetraen-17-one and 2.0 ml. of 5% aqueous sodium hydroxide in 15 ml. of 2-diethylaminoethanol is stirred at room temperature in an atmosphere of nitrogen for three hours. The reaction mixture is diluted with water and extracted with ethyl acetate. The extract is washed with saturated sodium chloride solution, dried and evaporated to give 600 mg. of an oil whose infrared spectrum indicated it to be a mixture of starting material and product. The oil is subjected to partition chromatography on diatomaceous earth with an n-heptane-methanol solvent system. Hold-back volume 9.5–10 gave 70 mg., melting point 131–134° C. A sample for analysis is crystallized from acetone-petroleum ether and has melting point 131–134° C., $[\alpha]_D$ +57°.

EXAMPLE 3

Preparation of 3-hydroxy-15β-(γ-diethylaminopropoxy)-estra-1,3,5(10)-trien-17-one Following the procedure of Example 1 and substituting 3-diethylaminopropanol for 2-dimethylaminoethanol the product of the example is obtained.

EXAMPLE 4

Preparation of 3-hydroxy-15β-(δ-diethylaminobutoxy)-estra-1,3,5(10)-trien-17-one Using the procedure of Example 1 and substituting 4-diethylaminobutanol for 2 - dimethylaminoethanol the product of the example is obtained.

EXAMPLE 5

Preparation of 3-hydroxy-15β-(β-diethylaminoethoxy)-estra-1,3,5(10)-trien-17-one hydrochloride Treating the product of Example 2 in ether with hydrogen chloride gives the product of the example.

EXAMPLE 6

Preparation of 3-hydroxy-15β-(β-diethylaminoethoxy)-17-isonitroso-estra-1,3,5(10)-triene Heating the product of Example 2 in ethanol with hydroxylamine hydrochloride in the presence of potassium hydroxide gives the product of the example.

EXAMPLE 7

*Preparation of 3-hydroxy-15β-(β-diethylaminoethoxy)-17-methoximino-estra-1,3,5(10)-triene*

The product of Example 2 in ethanol is heated with methoxyamine hydrochloride in the presence of potassium hydroxide to give the product of the example.

We claim:

1. A compound selected from the group consisting of:

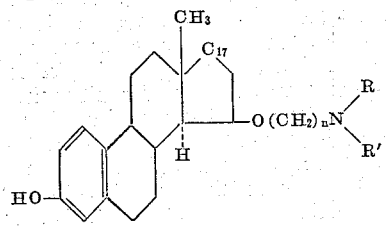

wherein R and R' are lower alkyl radicals, $n$ is an integer from 2 to 4 and $C_{17}$ is selected from the group consisting of $>C=O$, $>C=NOH$ and $>C=NO$-lower alkyl and its mineral acid salts.

2. The compound 3-hydroxy-15β-(β-dimethylaminoethoxy)-estra-1,3,5(10)-trien-17-one.

3. The compound 3-hydroxy-15β-(β-diethylaminoethoxy)-estra-1,3,5(10)-trien-17-one.

4. The compound 3-hydroxy-15β-(β-diethylaminoethoxy)-17-isonitroso-estra-1,3,5(10)-triene.

5. The compound 3-hydroxy-15β-(β-diethylaminoethoxy)-17-methoximino-estra-1,3,5(10)-triene.

6. The compound 3-hydroxy-15β-(γ-diethylaminopropoxy)-estra-1,3,5(10)-trien-17-one.

7. The compound 3-hydroxy-15β-(δ-diethylaminobutoxy)-estra-1,3,5(10)-trien-17-one.

No references cited.